United States Patent
Coffey

[11] 3,969,760
[45] July 13, 1976

[54] SAMPLING PHASE IDENTIFICATION APPARATUS

[75] Inventor: John Albert Coffey, Newbury, England

[73] Assignee: Quantel, Limited, England

[22] Filed: May 30, 1975

[21] Appl. No.: 582,514

[30] Foreign Application Priority Data
June 3, 1974 United Kingdom............... 24421/74

[52] U.S. Cl.............................. 358/8; 178/69.5 CB; 358/17
[51] Int. Cl.²...................... H04N 9/44; H04N 5/76
[58] Field of Search.................. 178/69.5 CB; 358/8, 358/17

*Primary Examiner*—Robert L. Richardson
*Attorney, Agent, or Firm*—Dowell & Dowell

[57] ABSTRACT

The apparatus for comparing clock phase identification signals in a time base corrector so as to control the Writing and Reading of information into and out of storage means therein, the storage means including a plurality of stores for storing sequential line information. The apparatus includes means for deriving in-phase and anti-phase "Write" clock phase identification signals from line frequency sync signals. Selector means select one of the in-phase or anti-phase signals and first latch means receive the selected one of the signals. Means are provided for simultaneously deriving a "Read" clock phase identification signal at a frequency which is half the line frequency from a sub-carrier reference signal. Second latch means receive the Read clock phase identification signal and comparator means compare the output signals from the first and second latch means to produce a Write clock phase identification control pulse so as to select the other of the in-phase and anti-phase Write clock phase identification signals in the selector means when the states of the signals applied to the comparator means are dissimilar.

7 Claims, 2 Drawing Figures

SAMPLING PHASE IDENTIFICATION APPARATUS

BACKGROUND OF THE INVENTION

This invention relates to a method and apparatus for identifying the sampling phase with respect to the colour sub-carrier of a digital television system and is particularly, but not solely applicable to a digital time base corrector of the kind disclosed in co-pending U.S. patent applications Ser. Nos. 558,091 and 558,090.

In a digital television system using the NTSC colour system, it is often desirable to have the sampling frequency equal to three times the colour sub-carrier frequency. However, it is also often desirable that the sampling be coherent on a line to line basis, i.e. the sample points align vertically in the picture. In order to achieve this with the NTSC colour system, the phase of the clock frequency locked to three times sub-carrier frequency is alternated by 180° line to line to produce the required line coherent sampling pulses. If the sampled digital data is then written into a digital storage system and subsequently read from that storage system under the control of similar line coherent clock pulses, then it is desirable under certain circumstances that the two possible phase relationships of the Write and Read clock pulses to the colour sub-carrier frequency are identified on the input and output side of the storage and can be matched together.

One circumstance under which it is important to identify the sampling phase is when the colour sub-carrier burst is not written into the storage along with the active line time. When this is the case, the burst is often re-inserted on the Read side of the store in some predetermined phase relationship with the output signal. To make sure the burst to chrominance phase relationship is not changed by 180° after a disturbance to the input signal or to the locking signal controlling the Read operation, it is necessary to perform the afore-mentioned phase identification and input/output matching.

SUMMARY OF THE INVENTION

According to the invention there is provided a digital time base corrector having a triggered oscillator for driving, an analogue-to-digital converter for receiving and converting analogue video information to digital form, control means for writing digital information from said converter into storage means, and control means for reading said digital information from said storage means, said oscillator being triggered by means of signals received from a transition detector connected via delay means to a sync pulse separator, said transition detector also being connected to comparator means having an input connected to a band pass filter for receiving said analogue video information, said storage means including a plurality of stores for storing sequential line information; the provision of apparatus comprising means for deriving in-phase and anti-phase Write clock phase identification signals from line frequency sync signals; selector means for selecting one of the in-phase or anti-phase signals; first latch means for receiving said selected one of said signals; means for simultaneously deriving a Read clock phase identification signal at a frequency which is half the line frequency from a sub-carrier reference signal; second latch means for receiving the Read clock phase identification signal; comparator means for comparing the output signals from the first and second latch means to produce a Write clock phase identification control pulse so as to select the other of the in-phase and anti-phase Write clock phase identification signals in said selector means when the states of the signals applied to the comparator means are dissimilar.

A time base corrector may have four separate 1-line stores to provide its window of time base correction. The clock phase identification phase comparison is only performed on the input and output of one of these four stores. This means that the phase match between the Write and Read sides of the storage is only compared every four lines.

BRIEF DESCRIPTION OF THE DRAWINGS

The invention will now be described by way of example with reference to the accompanying drawings, in which.

DESCRIPTION OF PREFERRED EMBODIMENT

Figure 1:
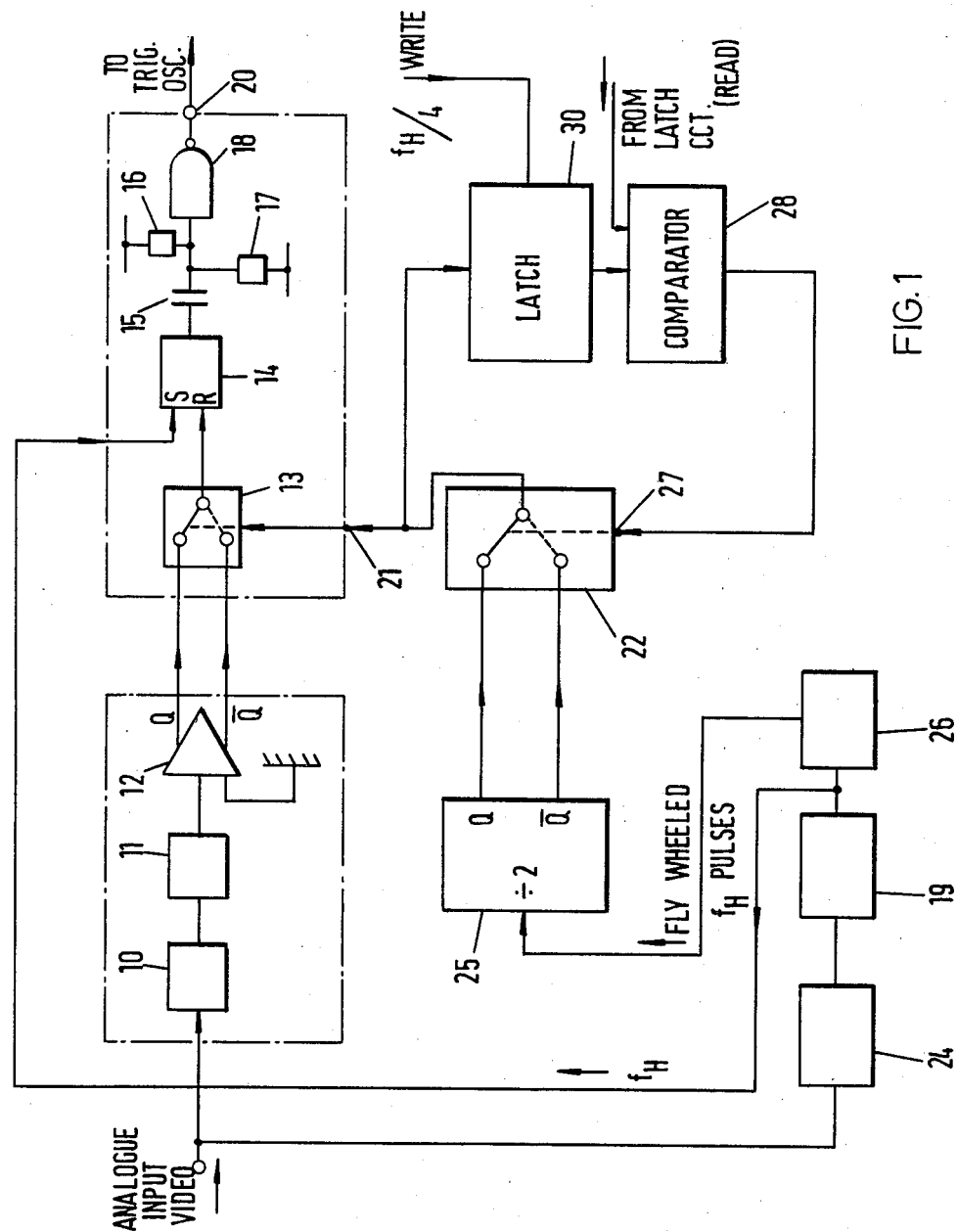
FIG. 1 shows the generation of the Write side clock phase identification pulse and the clock phase identification comparison circuits.

In the circuit of FIG. 1, a feed of the input video to the time base corrector is fed to a narrow band pass filter 10 around the colour sub-carrier frequency and the burst is separated from the rest of the chrominence signal information by means of a burst gate separator 11. The gated burst is then fed to a zero crossing detector circuit 12. Both in-phase and anti-phase states of the sliced burst are represented by the Q and $\overline{Q}$ outputs of the zero crossing detector 12 and are fed to a polarity switch 13 and transition detector 14. The output of the transition detector 14 is coupled via a differentiating circuit comprising capacitor 15 and resistors 16 and 17 and an inverter 18 to output 20 which provides start pulses for the triggered oscillator (see items 10, 11, 12 of U.S. patent applications Ser. Nos. 558,091 and 558,090). The active edge of the sliced burst is alternated positive to negative line to line in sympathy with the Write clock phase identification pulse being fed to it at input 21 from the clock phase identification change circuit 22. This is achieved by selecting either the in-phase or anti-phase sliced burst signal fed from zero crossing detector 12. This selected active edge is then used in conjunction with the coarse start oscillator pulse from a sync pulse separator 24 via delay 19 entering at input S of detector 14 to start the triggered oscillator controlling the ADC and store.

The Write clock phase identification pulse is formed by dividing input horizontal sync pulses by two producing a half horizontal frequency square wave. This is done in divider 25 having its input connected to the output of a phase locked loop 26 which is used to ensure continuity of horizontal frequency pulses even if some input horizontal sync pulses are missing due to tape faults. Bi-phase control is provided at the input 27 of the change circuit 22 from a clock pulse identification comparison circuit (exclusive OR) 28. This clock phase identification pulse is latched in latch circuit 30 by a pulse occurring at quarter line frequency. This quarter line frequency pulse is derived from the control circuit for the store and is fixed in phase with respect to the Write pulse timing of one of the stores. Thus, the output of latch 30 represents the Write clock phase identification of, say, store 1. A similar latching arrangement is provided in latch 35 (see FIG. 2) for the Read clock phase identification pulses. Thus, the output of latch 35 represents the Read clock phase identification of store 1. These two latched clock phase identification signals may be compared by the comparison circuit 28, and if they do not match the Write clock phase identification pulse may be reversed in phase by changing the switch in change circuit 22 under the control of the Write clock pulse identification control signal.

Figure 2:
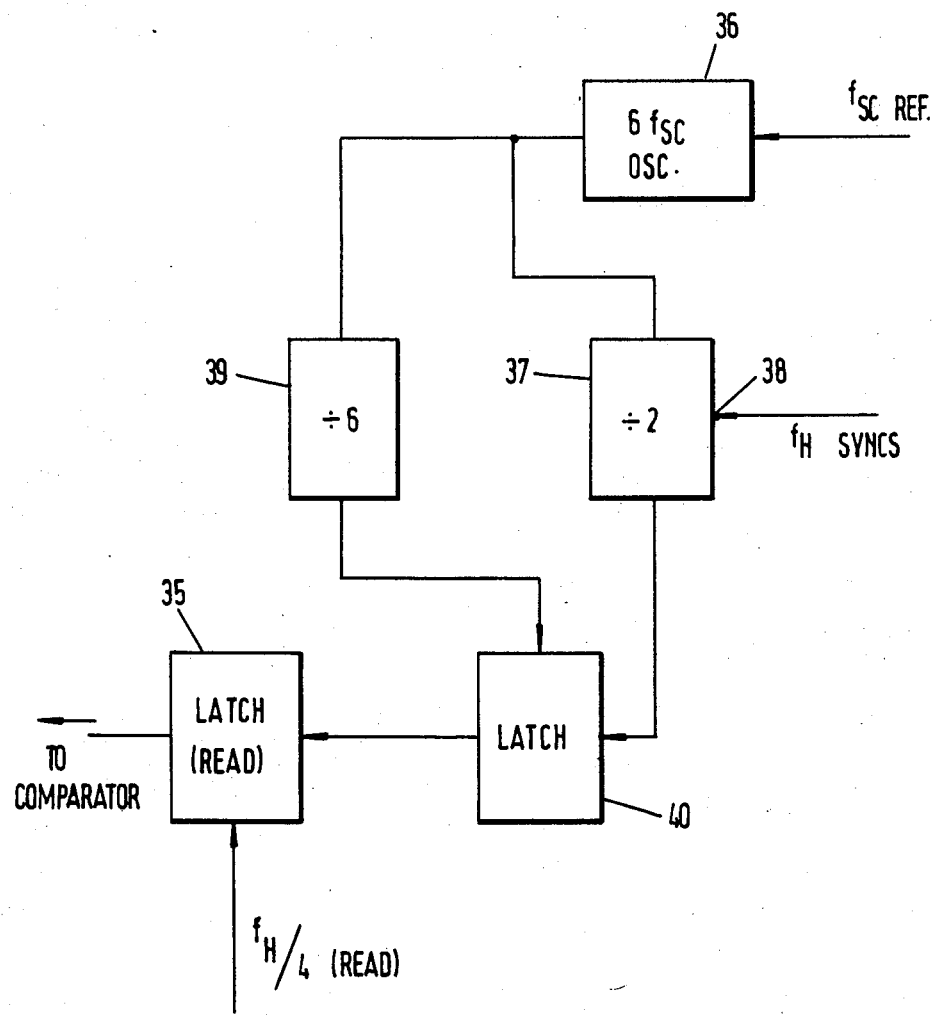
FIG. 2 shows a circuit for the generation of Read clock phase identification pulses.

The generation of Read clock phase identification pulses is shown in FIG. 2 in which six times sub-carrier frequency clocks are produced in a phase locked loop circuit 36 locked to the output sub-carrier reference signal. The line coherent three times sub-carrier frequency clock pulses are produced from these six times sub-carrier frequency clocks in a divide by two circuit 37 which is reset to a predetermined state during each horizontal blanking period, by a horizontal reference pulse at input 38. Because there are an odd number of half periods of three times sub-carrier frequency in each horizontal period, this resetting of the divide by two circuits produces a line by line phase shift of 180° in the three times sub-carrier frequency clocks thus making them coherent on a line to line basis. The six times sub-carrier frequency clocks are also divided by six to produce sub-carrier frequency pulses in a divider 39. These sub-carrier frequency pulses are used to latch the switched three times sub-carrier frequency pulses in a D type latch circuit 40. The relative phase between the sub-carrier frequency pulses and the switched three times sub-carrier pulses will alternate line by line, and thus the output of the latch circuit consists of a half line frequency square wave which may be used as the Read clock phase identification signal to feed to the comparison circuit 28 of FIG. 1.

The particular system described above is for NTSC only, although it may be expanded for a 3 × PAL sub-carrier frequency sampling system, where there would be four different phase relationships to identify, instead of the two of the NTSC case.

We claim:
1. In a digital timebase corrector having a triggered oscillator for driving an analogue-to-digital converter for receiving and converting analogue video information to digital form, control means for writing digital information from said converter into storage means, and control means for reading said digital information from said storage means, said oscillator being triggered by means of signals received from a transition detector connected via delay means to a sync pulse separator, said transition detector also being connected to comparator means having an input connected to a band pass filter for receiving said analogue video information, said storage means including a plurality of stores for storing sequential line information; the provision of apparatus comprising:
 a. means for deriving in-phase and anti-phase Write clock phase identification signals from line frequency sync signals;
 b. selector means for selecting one of the in-phase or anti-phase signals;
 c. first latch means for receiving said selected one of said signals;
 d. means for simultaneously deriving a Read clock phase identification signal at a frequency which is half the line frequency from a sub-carrier reference signal;
 e. second latch means for receiving the Read clock phase identification signal;
 f. comparator means for comparing the output signals from the first and second latch means to produce a Write clock phase identification pulse so as to select the other of the in-phase and anti-phase Write clock phase identification signals in said selector means when the states of the signals applied to the comparator means are dissimilar.

2. An apparatus according to claim 1, wherein said means for deriving said in-phase and anti-phase Write clock phase identification signals comprises a divide by two circuit at the output of which appears said identification signals and a phase locked loop connected to the input of the divide by two circuit, said phase locked loop having an input connected to said sync pulse separator via said delay means.

3. An apparatus according to claim 1, wherein said first latch means for receiving said selected one of said Write clock phase identification signals comprises a latch circuit latched by a pulse occurring at a submultiple of the line frequency derived from said control means for the store, said pulse being fixed in phase with respect to the Write pulse timing of one of the stores, said submultiple being related to the number of stores in said storage means.

4. An apparatus according to claim 1, wherein said means for simultaneously deriving a Read clock phase identification signal comprises a D-type latch having a first input receiving clock pulses switched by 180° line by line and a second input receiving clock pulses at sub-carrier frequency.

5. An apparatus according to claim 4, wherein said clock pulses applied to said first input of the D-type latch are derived via a divide by two circuit from a six times sub-carrier frequency oscillator locked to a sub-carrier reference.

6. An apparatus according to claim 5, wherein said second input of the D-type latch receives the sub-carrier frequency pulses from a divide by six circuit connected to the output of said six times sub-carrier frequency oscillator.

7. An apparatus according to claim 1, wherein said second latch means for receiving the Read clock phase identification signal comprises a latch circuit latched by a pulse occurring at a submultiple of the line frequency derived from said control means for the store, said pulse being fixed in phase with respect to the Read pulse timing of one of the stores, said submultiple being related to the number of stores in said storage means.

* * * * *